UNITED STATES PATENT OFFICE.

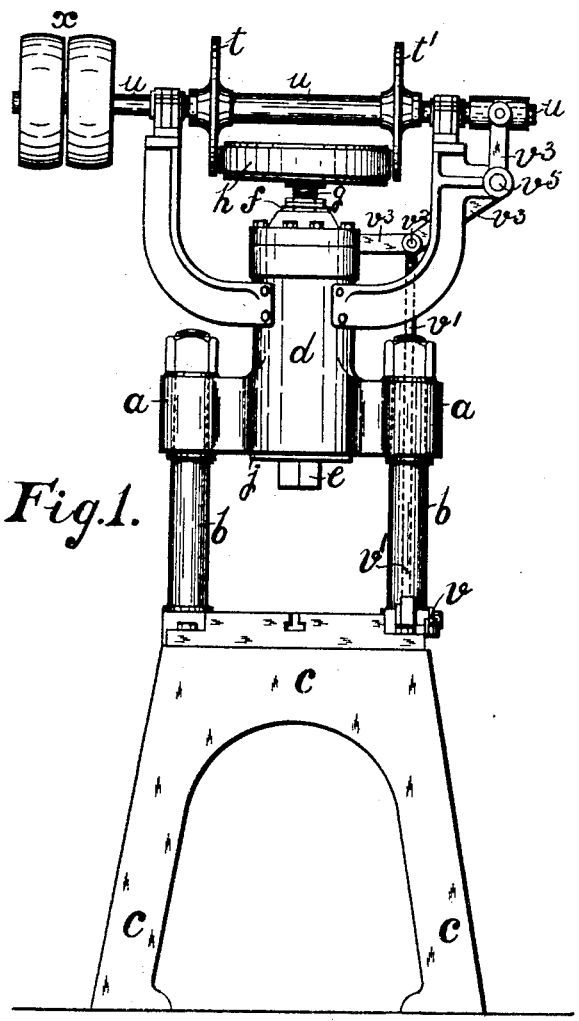

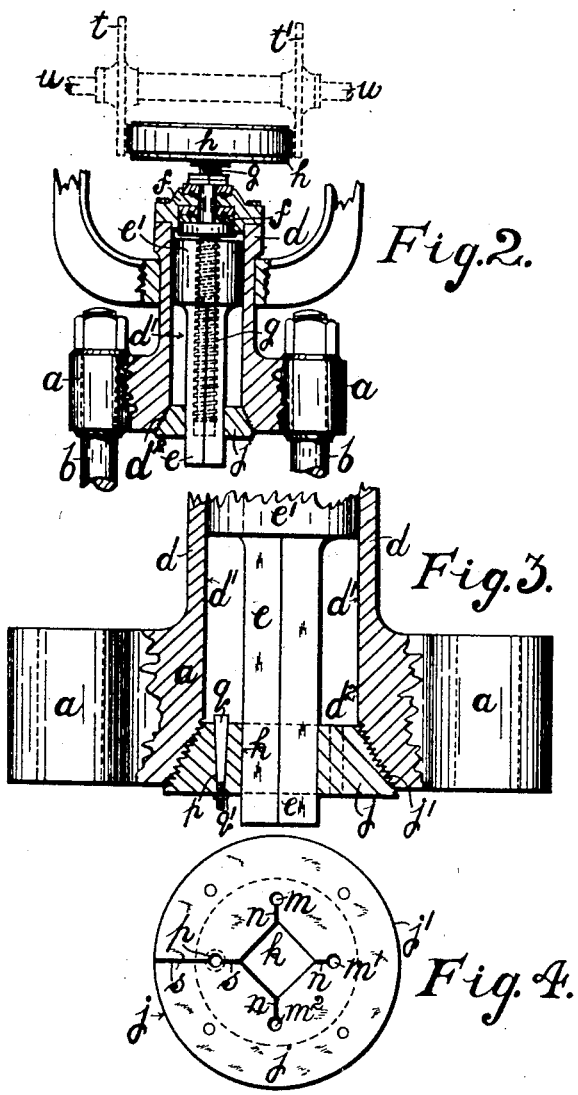

EDWARD JOHNSON, OF BURSLEM, STOKE-UPON-TRENT, ENGLAND.

POWER-DRIVEN PRESS.

1,397,890.  Specification of Letters Patent.  Patented Nov. 22, 1921.

Application filed January 4, 1921. Serial No. 435,004.

*To all whom it may concern:*

Be it known that I, EDWARD JOHNSON, subject of the King of Great Britain and Ireland, and resident of Burslem, Stoke-upon-Trent, in the county of Stafford, England, engineer, have invented certain new and useful Improvements in Power-Driven Presses, (for which I have filed application in Great Britain by application for Patent No. 114,637 dated the 5th March, 1917,) of which the following is a specification.

My invention relates to improvements in power driven presses for shaping or pressing articles from plastic or other material and has reference to that type of power driven press operated by revolving disks on a driven shaft coming into frictional contact with the periphery of a fly or friction wheel keyed on the screw the latter moving in bearings and receiving a rotary motion only to raise and lower the plunger or slide which carries the die or other shaping tool. The object of my invention is to provide improved means for controlling or guiding and adjusting the plunger or slide which carries the shaping tool or die and moves inside the tubular frame or crosshead.

My invention will be fully described with reference to the accompanying drawings in which, Figure 1 is an elevation of a power driven press having my improvements applied thereto, Fig. 2 is a sectional elevation of part of Fig. 1, Fig. 3 is a sectional elevation, to an enlarged scale, of the tubular frame or crosshead and slide, and Fig. 4 is a plan of an adjustable bearing to be hereinafter described.

In accordance with my said invention I employ a tubular frame or crosshead $a$ fixed to vertical pillars $b$ carried by the frame $c$ of the machine in the ordinary way. The said crosshead $a$ is constructed with a central hollow vertical projection $d$ extending upwardly to form a guide for the plunger or slide $e$ which carries the die or other shaping tool (not shown), the upper part of the extension $d$ being shaped to form part of a ball bearing, or to support a ball bearing $f$, for a rotatable screw $g$ (see Fig. 2) carrying the horizontal friction wheel $h$. The friction wheel $h$ and the rotatable screw $g$ are of the usual construction, the screw $g$ only rotating in its bearings and not rising and falling.

The thread on the lower end of the screw $g$ engages a corresponding thread in the slide $e$ so that as the screw rotates with the friction wheel $h$, the slide $e$ carrying the die or other shaping tool is raised and lowered. The upper part $e^1$ of the slide is of the same diameter as the central hole $d^1$ through the fixed crosshead $a$ so as to slide therein and be guided thereby the lower reduced portion of the slide being square, or having flat surfaces, to prevent rotation thereof and guided by an adjustable resilient bearing $j$ of special construction forming an important feature of this invention. The adjustable bearing $j$ shown in sectional elevation at the lower end of Fig. 3 and in inverted plan at Fig. 4 is of conical formation and is screw-threaded at $j^1$ to engage a correspondingly shaped threaded hole $d^2$ at the lower end of the crosshead $a$. The center $k$ of the conically shaped bearing is of square formation for the slide $e$ to move in and to enable it to make a close sliding fit on the slide it is provided with three vertical holes $m$ $m^1$ $m^2$ having slits or slots $n$ extending inwardly to the three corners of the square as shown at Fig. 4. The fourth corner of the square is provided with a tapered slot or hole $p$ to accommodate a cotter or conical pin $q$ (Fig. 3) screwed at its lower end to receive a nut $q^1$, a slit $s$ extending from the conically shaped cotter hole to the corner of the square and to the outside of the bearing. The bearing $j$ is screwed into the conical hole $d^2$ in the crosshead so that the square $k$ therein embraces the square part of the slide $e$, the nut $q^1$ on the conically shaped pin or cotter $q$ is screwed up, which causes the split bearing to bear against the crosshead $a$. The arrangement of holes and slits in the conical bearing allows it to yield when the cotter $q$ is being tightened and be accurately adjusted as desired.

The horizontal friction wheel $h$ is keyed on the screw $g$ and as the latter does not rise and fall, it is only necessary to employ vertical disks $t$ and $t^1$ of small diameter. The disks $t$ and $t^1$ are carried by a shaft $u$ driven by a belt on a fast and loose pulley at $x$ in the ordinary way. The friction wheel $h$ has its periphery faced with leather or other suitable material in the usual manner to make frictional contact with the vertical disks $t$ and $t^1$.

In some cases the friction wheel may have a plain periphery to engage a leather or similar facing on the flat inner side of each vertical disk. Or a facing of leather or the like may be employed both on the periphery of the friction wheel $h$ and on the vertical disks $t$ and $t^1$.

The usual mechanism is employed for sliding each of the vertical disks $t$ and $t^1$ in and out of contact with the friction wheel $h$. The mechanism is shown on the drawings, $v$ being the hand controlling lever connected to a link or rod $v^1$ the latter being hinged at $v^2$ to a lever $v^3$ connected to the slidable disk shaft $u$. The disks $t$ and $t^1$ are shown on the drawings in their inoperative position. By pressing the hand lever $v$ down the lever $v^3$ is moved on its hinge pin $v^5$ sliding the disk shaft and disks so that the disk $t$ comes into contact with the friction wheel $h$ and the slide $e$ is brought down. On releasing the hand lever $v$ the rod $v^1$ automatically moves down, by its own weight and that of the connections, causing the disk $t^1$ to make contact with the friction wheel $h$ and the slide $e$ to move upward until it meets the inner arm of the lever $v^3$, this action bringing the disk $t$ into operation again.

A suitable locking lever, or safety catch lever, (not shown) may be employed to work in combination with the hand controlling lever $v$.

Although I have referred to the use of an adjustable bearing $j$ having a square hole for the slide to move in, I wish it to be understood that the central hole in such adjustable bearing may be octagonal or of other suitable formation for a corresponding shaped part of the slide to move in.

Provision may be made to allow the power press to give a second blow without withdrawing the tool or die from the partly pressed article.

What I claim as my invention and desire to secure by Letters Patent is:—

1. In a press, a housing, a plunger for operating a press tool slidable longitudinally in the housing and provided with a guide, a contractible bearing secured to the housing and engaging with the said guide and preventing it and the plunger from revolving, and means for sliding the said plunger in the housing.

2. In a press, a housing a plunger for operating a press tool slidable longitudinally in the housing and provided with a guide, a contractible bearing having a conical screw threaded portion which engages with the housing, said bearing having a guide hole for the guide which prevents it and the plunger from revolving, said bearing having also a split or slot, a tapering pin inserted in the said split or slot and affording a means for expanding the bearing, and driving devices for sliding the said plunger in the housing.

3. In a power driven press of the type referred to and for the purposes stated the use of a split expansible and adjustable bearing of conical formation to engage a threaded conical hole in the tubular frame or crosshead and having a central hole for the plunger or slide to move in and to prevent its rotation during the rotary motion of the screw substantially as described.

In testimony whereof I have hereunto set my hand in the presence of two witnesses.

EDWARD JOHNSON.

Witnesses:
J. BENTON,
P. PLANT.